(12) United States Patent
Kawamura et al.

(10) Patent No.: US 9,130,699 B2
(45) Date of Patent: Sep. 8, 2015

(54) MOBILE COMMUNICATION SYSTEM, TRANSMITTING DEVICE, RECEIVING DEVICE, AND METHOD

(75) Inventors: Teruo Kawamura, Yokosuka (JP); Yoshihisa Kishiyama, Yokosuka (JP); Mamoru Sawahashi, Yokohama (JP)

(73) Assignee: NTT DOCOMO, INC., Tokyo (JP)

( * ) Notice: Subject to any disclaimer, the term of this patent is extended or adjusted under 35 U.S.C. 154(b) by 768 days.

(21) Appl. No.: 12/919,239

(22) PCT Filed: Feb. 27, 2009

(86) PCT No.: PCT/JP2009/053741
§ 371 (c)(1),
(2), (4) Date: Oct. 20, 2010

(87) PCT Pub. No.: WO2009/110390
PCT Pub. Date: Sep. 11, 2009

(65) Prior Publication Data
US 2011/0026642 A1     Feb. 3, 2011

(30) Foreign Application Priority Data

Mar. 5, 2008 (JP) ................................. 2008-055580

(51) Int. Cl.
*H04L 27/28*     (2006.01)
*H04L 5/00*     (2006.01)
(Continued)

(52) U.S. Cl.
CPC ............ *H04L 5/0007* (2013.01); *H04L 1/1861* (2013.01); *H04L 5/0053* (2013.01);
(Continued)

(58) Field of Classification Search
CPC ... H04L 1/1861; H04L 1/0026; H04L 1/1854; H04L 5/0053; H04L 5/007; H04L 5/0091; H04L 5/0044; H04L 5/0064

USPC ......... 375/220, 229, 259, 260, 265, 316, 340; 370/203, 310, 311, 329, 344, 335, 480
See application file for complete search history.

(56) References Cited

U.S. PATENT DOCUMENTS 7,738,418 B2 * 6/2010 Kwon et al. ................... 370/328
2007/0206559 A1 * 9/2007 Cho et al. ...................... 370/344
(Continued)

FOREIGN PATENT DOCUMENTS

JP     2007-221755 A     8/2007

OTHER PUBLICATIONS

International Search Report w/translation from PCT/JP2009/053741 dated Jun. 2, 2009 (3 pages).
(Continued)

*Primary Examiner* — Syed Haider
(74) *Attorney, Agent, or Firm* — Osha Liang LLP

(57) ABSTRACT

A transmitting device for a mobile communication system employing a multicarrier scheme includes a mapping unit configured to map control information to subcarriers in a subframe; an inverse Fourier transform unit configured to inverse-Fourier-transform a signal of the mapped control information; and a transmitting unit configured to wirelessly transmit a transmission signal including the inverse-Fourier-transformed signal to a receiving device. The control information is mapped to control frequency bands that are discontinuous in the frequency domain and are provided across the subframe separately from frequency bands for a shared data channel. The mapping is performed such that the control information for the receiving device mapped to one of the control frequency bands is transmitted at the same time as the control information or the shared data channel for the receiving device mapped to a different frequency band.

7 Claims, 15 Drawing Sheets

(51) Int. Cl.
*H04L 1/00* (2006.01)
*H04L 1/18* (2006.01)

(52) U.S. Cl.
CPC ............ *H04L1/0026* (2013.01); *H04L 1/1854* (2013.01); *H04L 5/0044* (2013.01); *H04L 5/0064* (2013.01); *H04L 5/0091* (2013.01)

(56) References Cited

U.S. PATENT DOCUMENTS

2007/0218942 A1* 9/2007 Khan et al. ................. 455/553.1
2010/0027495 A1* 2/2010 Che et al. ..................... 370/329
2010/0067461 A1* 3/2010 Kwak et al. .................. 370/329
2011/0211510 A1* 9/2011 Kim et al. ..................... 370/311

OTHER PUBLICATIONS

Written Opinion from PCT/JP2009/053741 dated Jun. 2, 2009 (4 pages).
3GPP TSG RAN WG Meeting #47bis, R1-070103; "Downlink L1/L2 Control Signaling Channel Structure: Coding"; Sorrento, Italy; Jan. 15-19, 2007 (17 pages).

* cited by examiner

MOBILE COMMUNICATION SYSTEM, TRANSMITTING DEVICE, RECEIVING DEVICE, AND METHOD

TECHNICAL FIELD

The present invention generally relates to mobile communication technologies. More particularly, the present invention relates to a mobile communication system, a transmitting device, a receiving device, and a method employing next-generation mobile communication technologies.

BACKGROUND ART

In the field of mobile communication, successors to the third-generation mobile communication system are being discussed by a standardization group called 3GPP. For example, Long Term Evolution (LTE) is being discussed as a successor mobile communication system to W-CDMA, high speed downlink packet access (HSDPA), and high speed uplink packet access (HSUPA). A successor mobile communication system to LTE is also being discussed.

In such a mobile communication system, one or more resource blocks are allocated to user devices both in downlink and uplink communications. Resource blocks are shared by multiple user devices in the system. In each subframe of, for example, 1 ms, the base station performs a process called scheduling to select user devices to which resource blocks are to be allocated. A subframe may also be called a transmission time interval (TTI). In downlink, the base station transmits a shared channel using one or more resource blocks to user devices selected in the scheduling. This downlink shared channel may be called a physical downlink shared channel (PDSCH). In uplink, user devices selected in the scheduling transmit a shared channel to the base station using one or more resource blocks. This uplink shared channel may be called a physical uplink shared channel (PUSCH).

In a communication system where scheduling of radio resources is performed, it is necessary to signal (or report) allocation information for the shared channels to user devices basically for each subframe. As a downlink control channel for this signaling, a physical downlink control channel (PDCCH) or a downlink L1/L2 control channel may be used. The PDCCH, for example, includes the following information (see, for example, 3GPP R1-070103, Downlink L1/L2 Control Signaling Channel Structure: Coding, Jan. 15-19, 2007):

Downlink scheduling information
Uplink scheduling grant
Acknowledgement/negative-acknowledgement information (ACK/NACK)
Transmission power control command bit The downlink scheduling information may include information regarding a downlink shared channel. For example, the downlink scheduling information may include downlink resource block allocation information, identification information of user devices (UE IDs), the number of streams, information regarding precoding vectors, data sizes, modulation schemes, and information regarding hybrid automatic repeat request (HARQ).

The uplink scheduling grant, for example, includes information for an uplink shared channel such as uplink resource allocation information, identification information of user devices (UE IDs), data sizes, modulation schemes, uplink transmission power information, and information regarding a demodulation reference signal used in uplink MIMO.

The acknowledgement/negative-acknowledgement information (ACK/NACK) indicates whether retransmission is necessary for the PUSCH transmitted via uplink.

In uplink, the PUSCH is used to transmit user data, i.e., a normal data signal. Also, separately from the PUSCH, a physical uplink control channel (PUCCH) may be used to transmit, for example, downlink channel quality information (downlink channel quality indicator (CQI)) and acknowledgement/negative-acknowledgement information (ACK/NACK) for the PDSCH. The CQI is used, for example, for scheduling and adaptive modulation and coding (AMC) of the physical downlink shard channel. In uplink, a random access channel (RACH) and signals indicating requests for allocation of uplink and downlink radio resources may also be transmitted as necessary.

The acknowledgement/negative-acknowledgement information (ACK/NACK) can be basically represented by only one bit, but has the most essential role in retransmission control and greatly influences the system throughput. Therefore, the acknowledgement/negative-acknowledgement information (ACK/NACK) is preferably fed back as soon as it is generated. Also, as described above, the CQI indicates downlink channel conditions and is essential for scheduling and adaptive modulation and channel coding. Since the channel conditions constantly change, the CQI is preferably fed back to the base station at frequent intervals.

When resource blocks are allocated for uplink data transmission, the above control information can be promptly reported to the base station by using the resource blocks. However, there is a case where the CQI and the acknowledgement/negative-acknowledgement information for a downlink data channel need to be reported even when resource blocks are not allocated for uplink data transmission.

In the LTE system, single-carrier FDMA is used for uplink to make it possible to promptly report the CQI and the acknowledgement/negative-acknowledgement information to the base station even in such a case. Meanwhile, to further improve the frequency resource efficiency and the data rate, a multicarrier scheme is more preferable than a single-carrier scheme. However, technologies for efficiently transmitting the ACK/NACK and the CQI to the base station using a multicarrier scheme had not been fully discussed by the filing date of the present application.

DISCLOSURE OF INVENTION

Problems to be Solved by the Invention

An aspect of the present invention makes it possible to efficiently transmit control information that greatly influences the throughput of a mobile communication system employing a multicarrier scheme.

Means for Solving the Problems

An aspect of the present invention provides a transmitting device for a mobile communication system employing a multicarrier scheme. The transmitting device includes a mapping unit configured to map control information to subcarriers in a subframe; an inverse Fourier transform unit configured to inverse-Fourier-transform a signal of the mapped control information; and a transmitting unit configured to wirelessly transmit a transmission signal including the inverse-Fourier-transformed signal to a receiving device.

The control information is mapped to control frequency bands that are discontinuous in the frequency domain and are provided across the subframe separately from frequency bands for a shared data channel. The mapping is performed such that the control information for the receiving device mapped to one of the control frequency bands is transmitted at the same time as the control information or the shared data channel for the receiving device mapped to a different frequency band.

The mapping may be performed such that the control information for the receiving device mapped to one of the control frequency bands is transmitted at the same time as the control information for the receiving device mapped to another one of the control frequency bands.

The subframe may include multiple slots. Also, the mapping may be performed such that first control information and second control information for the receiving device are transmitted using different control frequency bands in the same slot. Also, the mapping may be performed such that the first control information and the second control information for the receiving device are transmitted using the same control frequency band and different codes for code division multiplexing. The first control information and the second control information for the receiving device may be transmitted over two or more slots. For example, in a first slot, the first control information may be transmitted using a first control frequency band and the second control information may be transmitted using a second control frequency band; and in a second slot, the first control information may be transmitted using the second control frequency band and the second control information may be transmitted using the first control frequency band. Alternatively, in the first slot, the first control information for the receiving device may be transmitted using first and second control frequency bands at the same time; and in the second slot, the second control information for the receiving device may be transmitted using the first and second control frequency bands at the same time. The first control information may be acknowledgement/negative-acknowledgement information for a previously received shared data channel. The second control information may indicate the quality of a received radio signal.

The transmitting device may be a user device for the mobile communication system.

Another aspect of the present invention provides a receiving device for a mobile communication system employing a multicarrier scheme. The receiving device includes a Fourier transform unit configured to Fourier-transform a received signal; a demapping unit configured to extract a signal mapped to subcarriers from the Fourier-transformed signal; and a decoding unit configured to decode control information extracted by the demapping unit. The control information is extracted from control frequency bands that are discontinuous in the frequency domain and are provided across a subframe separately from frequency bands for a shared data channel. The control information for the receiving device mapped to one of the control frequency bands and the control information or the shared data channel for the receiving device mapped to a different frequency band are included in the same slot in the subframe.

Advantageous Effect of the Invention

An aspect of the present invention makes it possible to efficiently transmit control information that greatly influences the throughput of a mobile communication system employing a multicarrier scheme.

EXPLANATION OF REFERENCES

Figure 1:
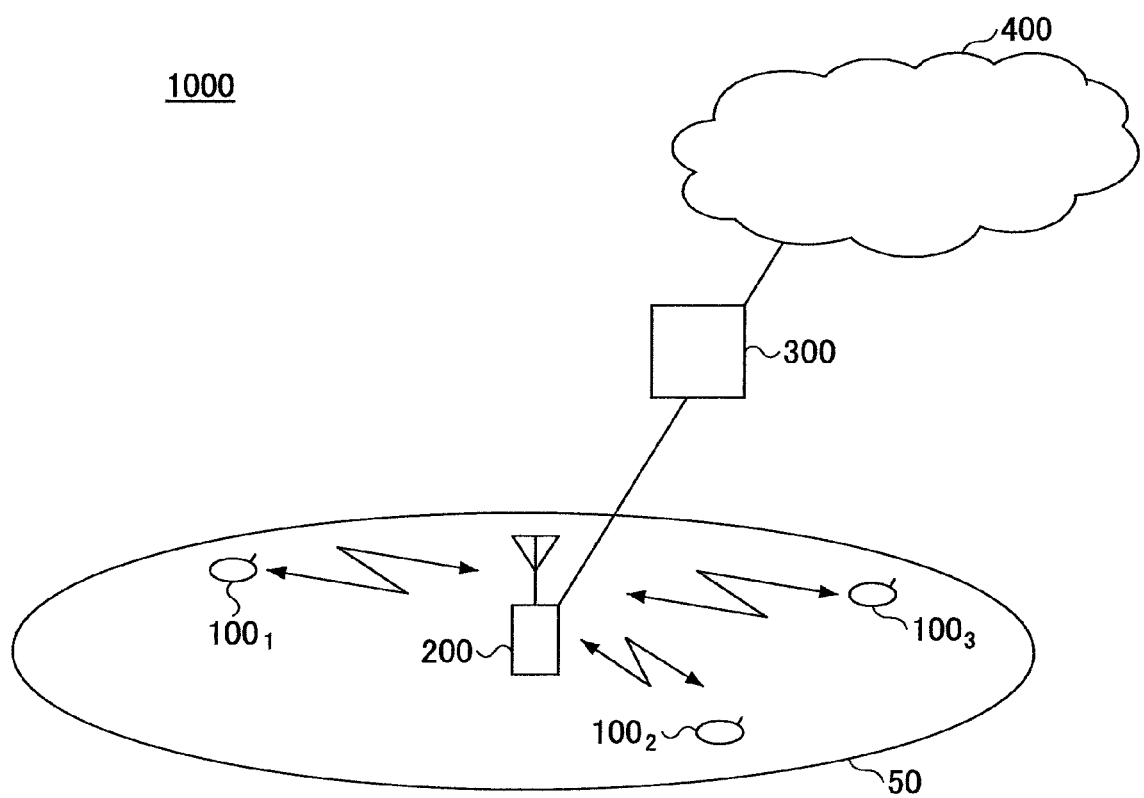
FIG. 1 is a schematic diagram of a mobile communication system.

50 Cell
$100_1$, $100_2$, $100_3$ User device
200 Base station
300 Upper node
400 Core network
14 OFDM signal demodulation unit
16 CQI estimation unit
18 Downlink control signal decoding unit
20 ACK/NACK determining unit
22 L1/L2 control signal processing block
24 Channel coding unit
26 Data modulation unit
28 Subcarrier mapping unit
30 Inverse fast Fourier transform unit (IFFT)
32 Guard interval adding unit (CP)
34 Pilot signal processing block
36 Pilot sequence generating unit
38 Subcarrier mapping unit
40 Inverse fast Fourier transform unit (IFFT)
42 Guard interval adding unit
44 Multiplexing unit
15 Synchronization-detection-and-channel-estimation unit
17 Guard interval removing unit
19 Fast Fourier transform unit (FFT)
21 Subcarrier demapping unit
23 Data demodulation unit
25 Data decoding unit
27 ACK/NACK determining unit
31 Scheduler
33 Uplink scheduling grant signal generating unit
35 Other-downlink-channels generating unit
37 OFDM signal generating unit

BEST MODE FOR CARRYING OUT THE INVENTION

Embodiments of the present invention are described below with reference to the accompanying drawings. Although specific values are used in the descriptions below to facilitate the understanding of the present invention, the values are just examples and any other appropriate values may also be used unless otherwise mentioned.

First Embodiment

<A. Control Information Transmission Method>

FIG. 1 is a schematic diagram of a mobile communication system 1000. The mobile communication system 1000 includes a cell 50; user devices (user equipment: UE) 100$_1$, 100$_2$, and 100$_3$ (may also be called the user device 100 and the user devices 100); a base station 200 wirelessly communicating with the user devices 100, an upper node 300 connected to the base station 200, and a core network 400 connected to the upper node 300. The upper node 300 may be implemented by a radio network controller (RNC), an access gateway (aGW), or a mobility management entity (MME). In this embodiment, it is assumed that the mobile communication system 1000 employs a multicarrier scheme for uplink and downlink. More particularly, it is assumed that the mobile communication system 1000 employs orthogonal frequency division multiplexing (OFDM) for uplink and downlink. Also, for descriptive purposes, it is assumed that the user device 100 transmits control information to the base station 200, and the control information includes uplink L1/L2 control information, acknowledgement/negative-acknowledgement information (ACK/NACK) for a data channel transmitted via downlink, and/or a channel quality indicator (CQI) indicating downlink channel conditions. However, the control information to be transmitted from the user device 100 may include any other appropriate information.

Below, control information transmission methods according to an embodiment of the present invention are described. The control information transmission methods described below are examples and do not encompass the entire scope of the present invention.

(Method 1)

Figure 2:
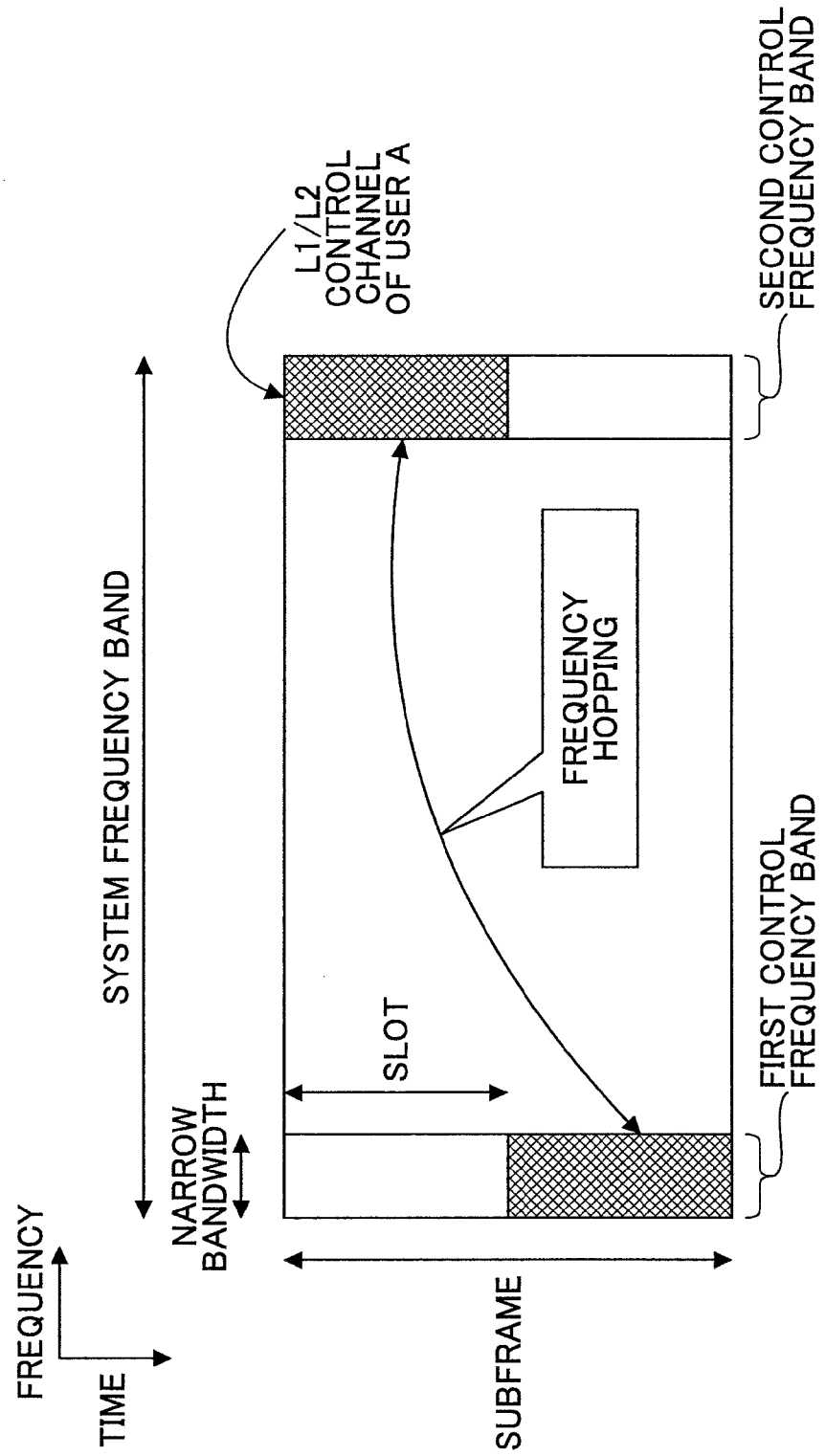
FIG. 2 is a drawing illustrating a control information transmission method (1)

FIG. 2 is a drawing illustrating a control information transmission method (1). In this example, two narrow frequency bands are provided at the right and left ends of a system frequency band including multiple (frequency) resource blocks. The system frequency band, for example, has a bandwidth of 5 MHz, 10 MHz, or 20 MHz. The two frequency bands at the right and left ends are reserved for transmission of control information. Here, for descriptive purposes, the frequency band at the low frequency end is called a first control frequency band and the frequency band at the high frequency end is called a second control frequency band. For example, each resource block for data transmission has a bandwidth of about 180 kHz, and each of the first and second control frequency bands also has a bandwidth of about 180 kHz. One radio frame, for example, is composed of a predetermined number (e.g., 10) of 1-ms subframes. Each subframe includes two slots. However, these values are just examples, and any other appropriate values may be used.

In the example shown in FIG. 2, an L1/L2 control channel is transmitted from user A to the base station in first and second slots that are consecutive. In the first slot, the second control frequency band is used; and in the second slot, the first control frequency band is used. Thus, control information is transmitted according to a frequency hopping pattern using frequency bands that are widely apart from each other in the system bandwidth. This method makes it possible to achieve a high frequency diversity gain and is therefore preferable to improve the reception quality of control information. In this example, frequency hopping is performed by changing the frequency band every slot. However, the frequency band may be changed less frequently (e.g., every subframe) or more frequently (e.g., every symbol in a slot). Since the first and second control frequency bands are not used at the same time, this method may also be applied to a system employing a single-carrier scheme.

(Method 2)

Figure 3:
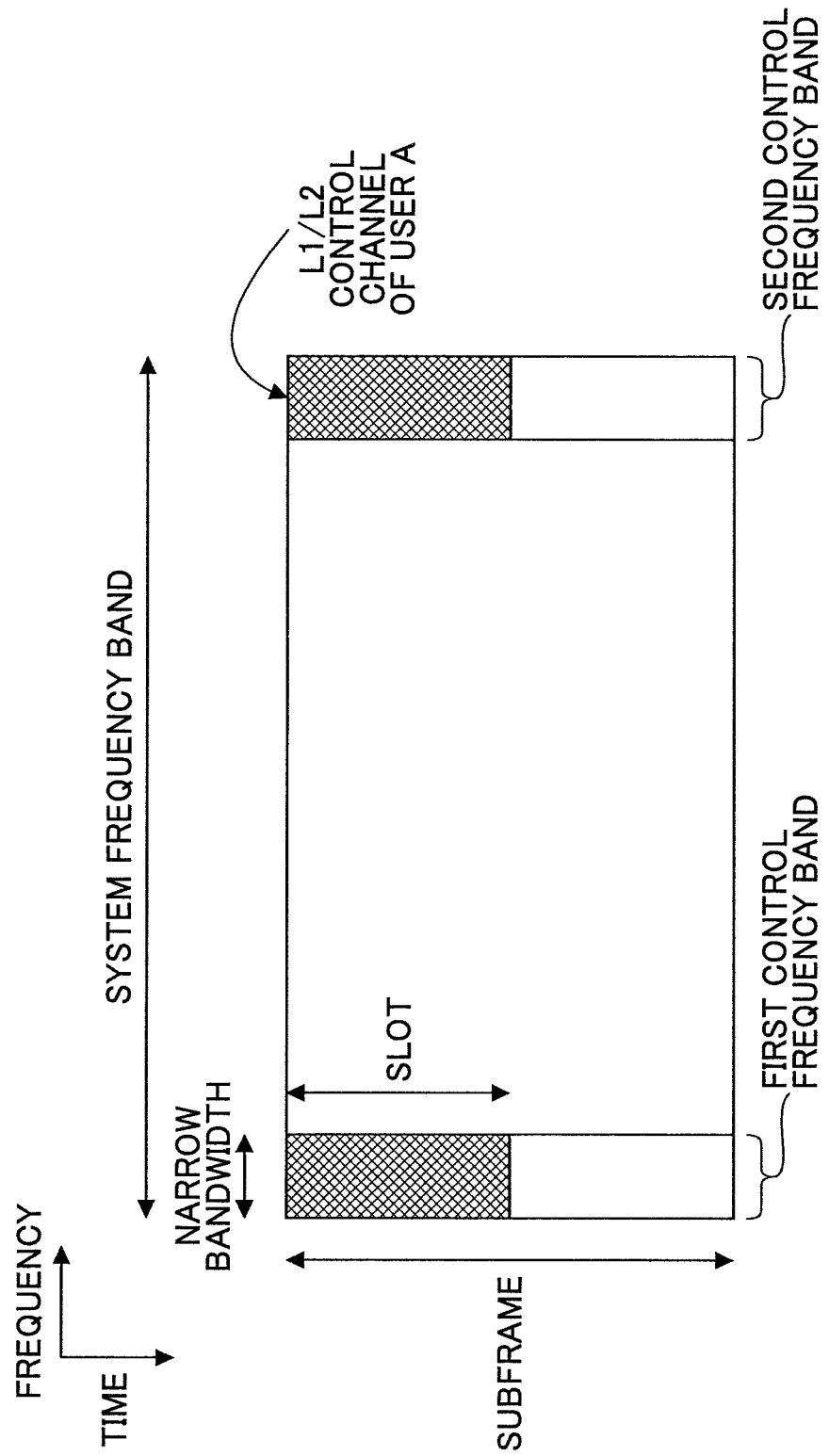
FIG. 3 is a drawing illustrating a control information transmission method (2)

FIG. 3 is a drawing illustrating a control information transmission method (2). In FIG. 3, similarly to FIG. 2, an L1/L2 control channel is transmitted from user A to the base station using the first and second control frequency bands. In this method, however, the first and second control frequency bands are used at the same time in the first slot. This method is applicable only to a system employing a multicarrier scheme. Although the first slot is used in FIG. 3, the second slot may instead be used. Still, using the first slot is preferable to complete the transmission of a control channel at an earlier stage.

(Method 3)

Figure 4:
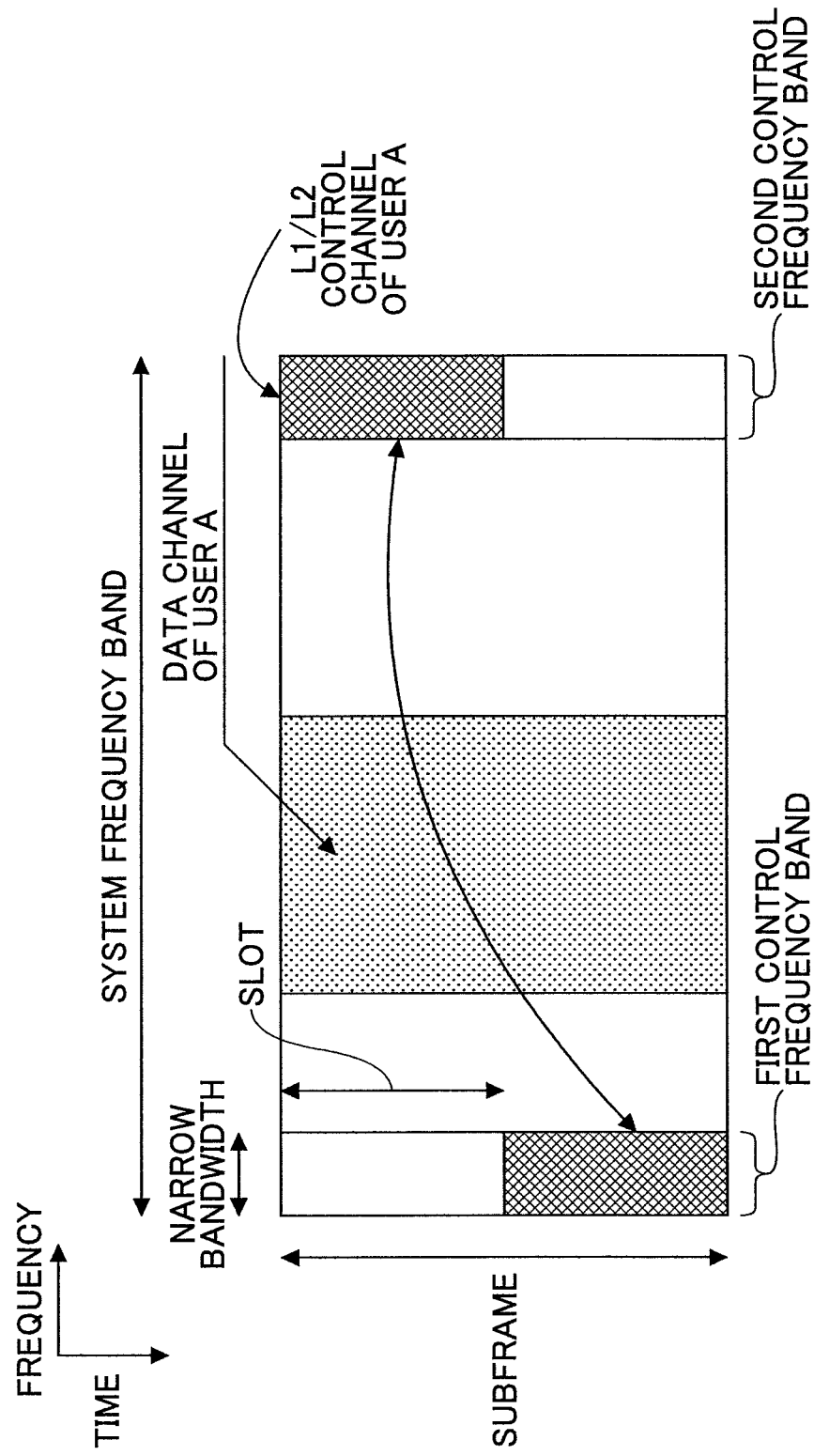
FIG. 4 is a drawing illustrating a control information transmission method (3)

FIG. 4 is a drawing illustrating a control information transmission method (3). In FIG. 4, similarly to FIG. 2, an L1/L2 control channel is transmitted from user A to the base station using the second control frequency band in the first slot and using the first control frequency band in the second slot. In the example shown in FIG. 4, however, a data channel of user A is also transmitted. Accordingly, a frequency band (resource block(s)) for the data channel and the second control frequency band are used at the same time in the first slot, and the frequency band for the data channel and the first control frequency band are used at the same time in the second slot. In other words, the L1/L2 control channel is transmitted using the first and second control frequency bands and the data channel is transmitted using a resource block(s) assigned to the data channel. Since the L1/L2 control channel is not included in the data channel, this method is preferable to improve the throughput of the data channel.

(Method 4)

Figure 5:
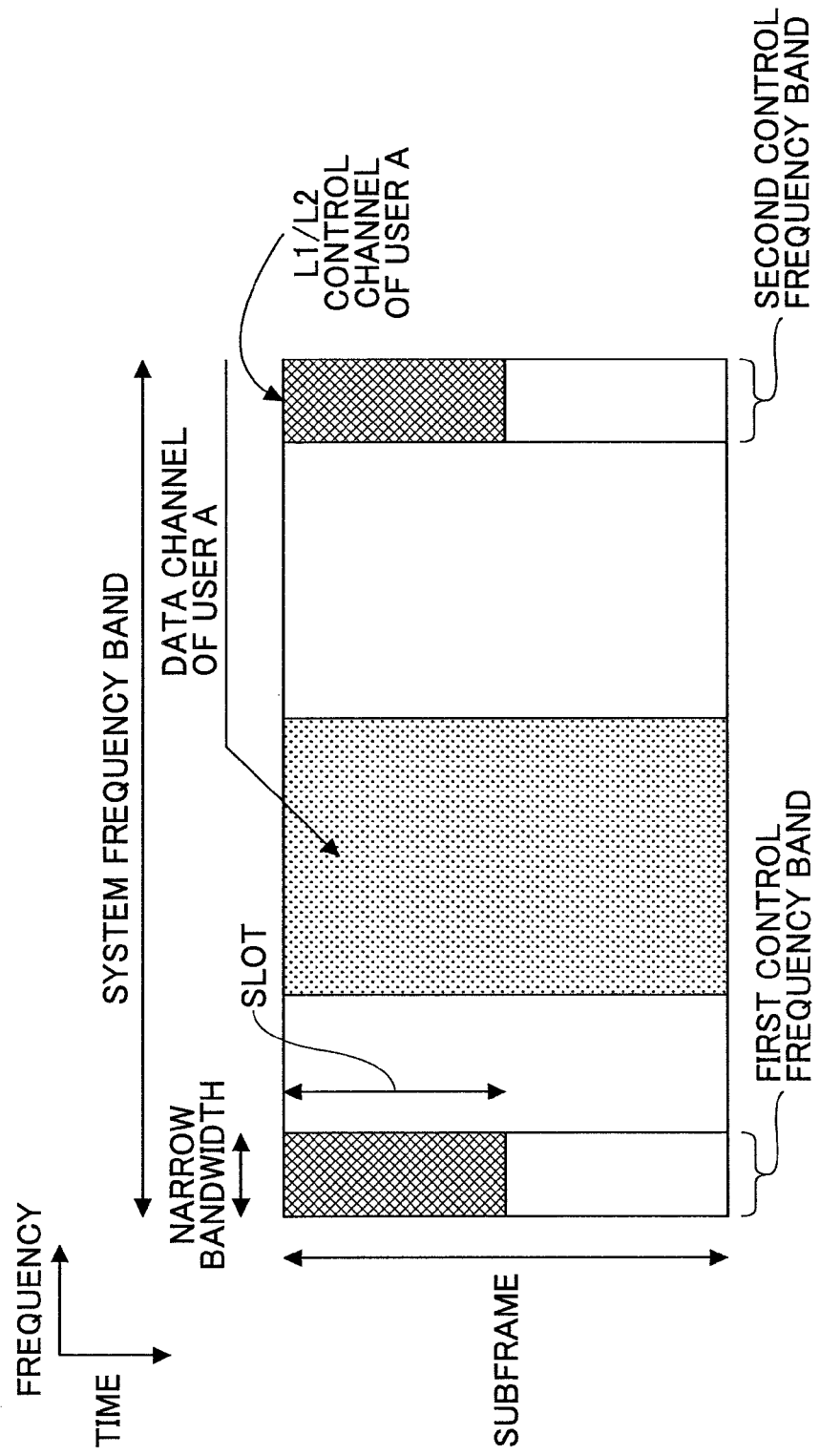
FIG. 5 is a drawing illustrating a control information transmission method (4)

FIG. 5 is a drawing illustrating a control information transmission method (4). In FIG. 5, similarly to FIG. 3, the first and second control frequency bands are used at the same time in the first slot. Also, similarly to FIG. 4, a data channel of user A is also transmitted. Thus, with this method, the frequency band for the data channel and the first and second control frequency bands are all used at the same time in the first slot, and only the data channel is transmitted in the second slot.

(Method 5)

Figure 6:
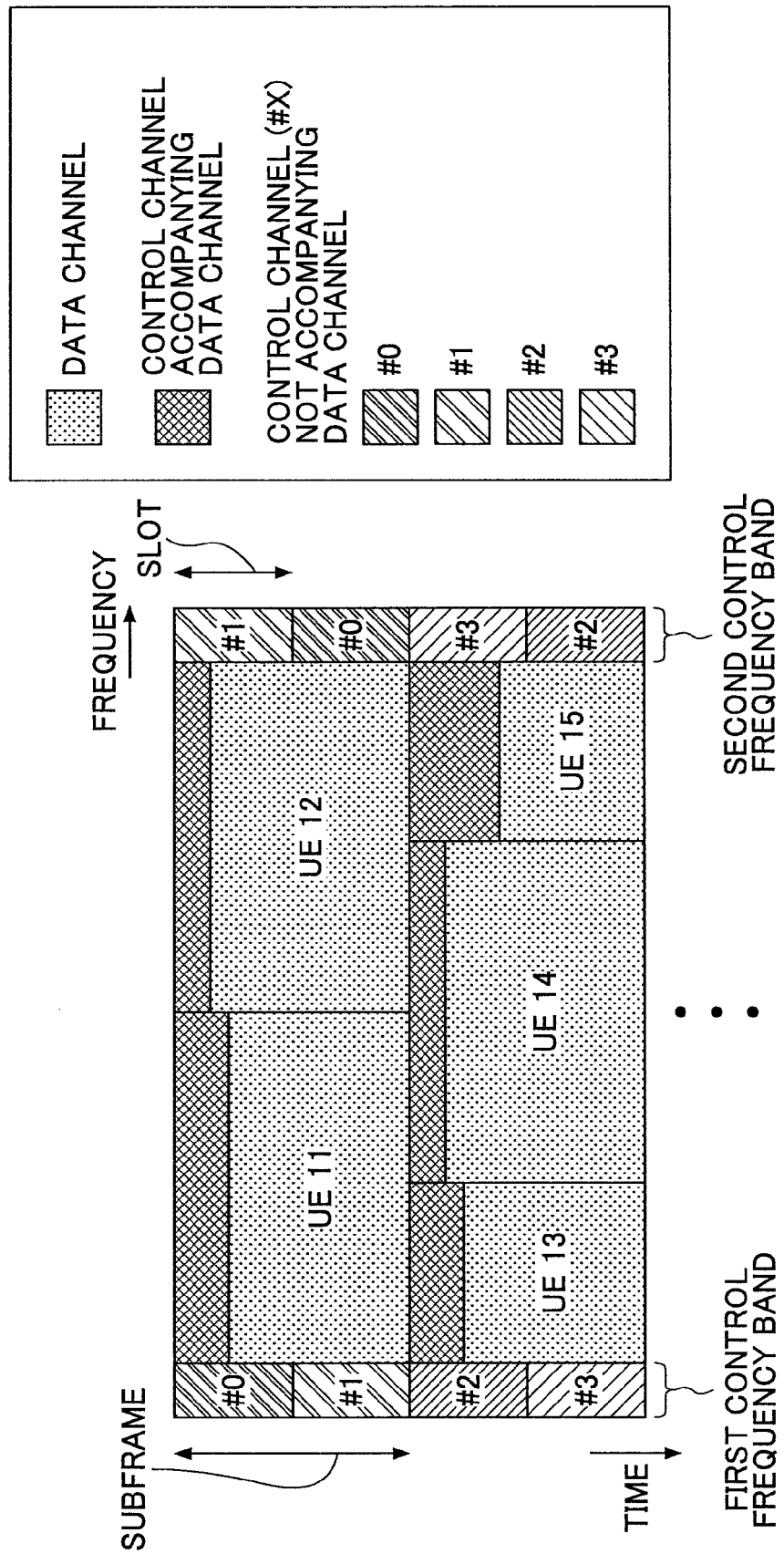
FIG. 6 is a drawing illustrating a control information transmission method (5)

FIG. 6 is a drawing illustrating a control information transmission method (5). In this method, control information is transmitted in different manners depending on whether resource blocks are allocated for transmission of data channels. When no resource block is allocated for transmission of data channels, L1/L2 control channels (#0, #1, #2, and #3) are transmitted from user devices to the base station in a manner similar to FIG. 4 by using the first and second control frequency bands according to a frequency hopping pattern. Meanwhile, when resource blocks are allocated for transmission of data channels, control information is transmitted using the allocated resource blocks. In this case, the control information and the data channels are time-division-multiplexed. In the example shown in FIG. 6, resource blocks are allocated to user devices UE11 through UE15, and user devices UE11 through UE15 transmit their data channels and control information using the allocated resource blocks.

(Method 6)

Figure 7:
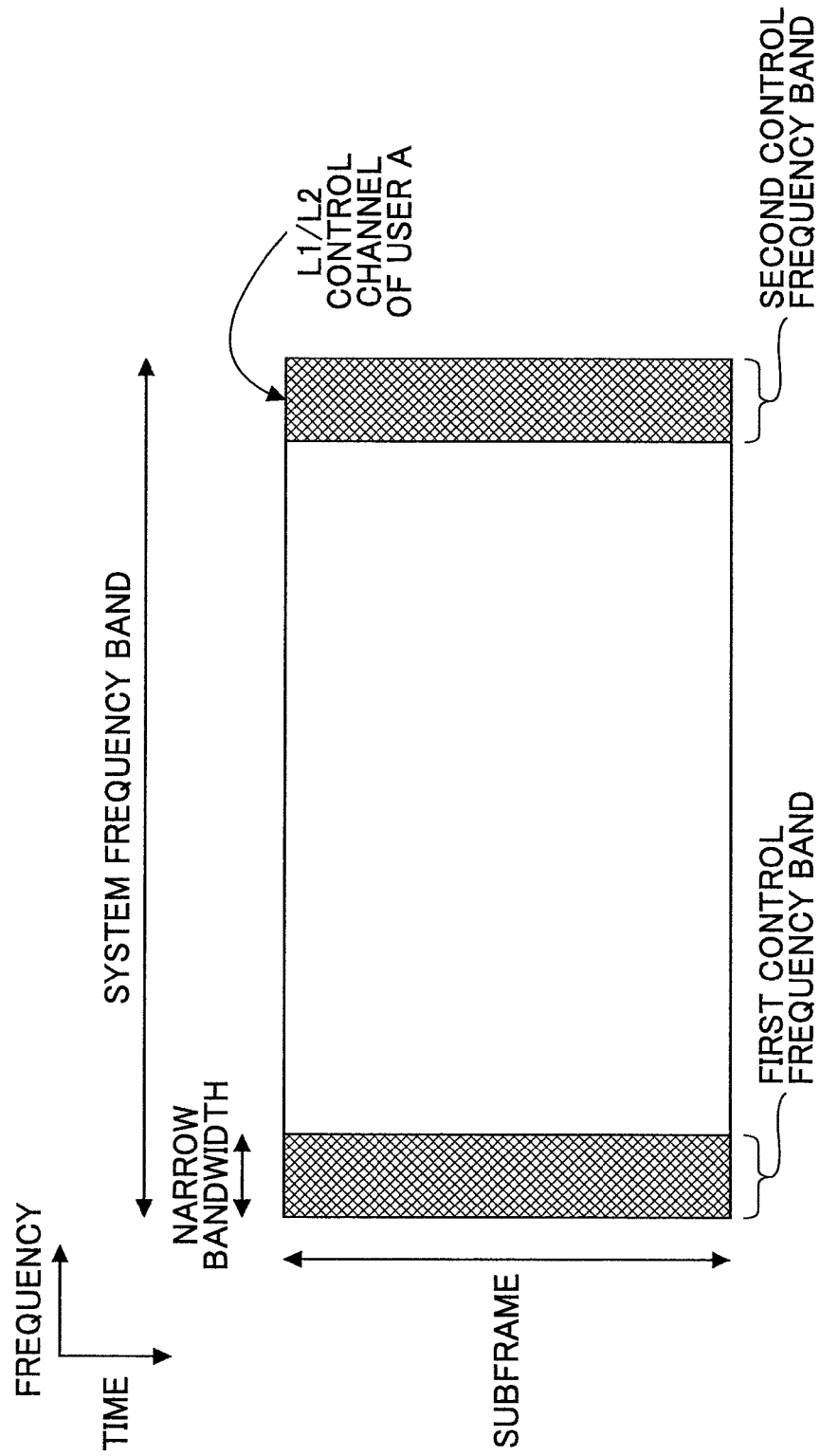
FIG. 7 is a drawing illustrating a control information transmission method (6)

FIG. 7 is a drawing illustrating a control information transmission method (6). In FIG. 7, similarly to FIG. 3, an L1/L2 control channel is transmitted from user A to the base station using the first and second control frequency bands at the same time. In this method, however, the first and second control frequency bands are used in the entire subframe (or two slots). This method is preferable when the number of bits of control information of each user is large or when the radio propagation conditions are poor. This method is preferable when the radio propagation conditions are poor because, compared with a case where the channel conditions are good, the data size of information with a given number of bits becomes larger to achieve desired quality when the channel conditions are poor.

(Method 7)

Figure 8:
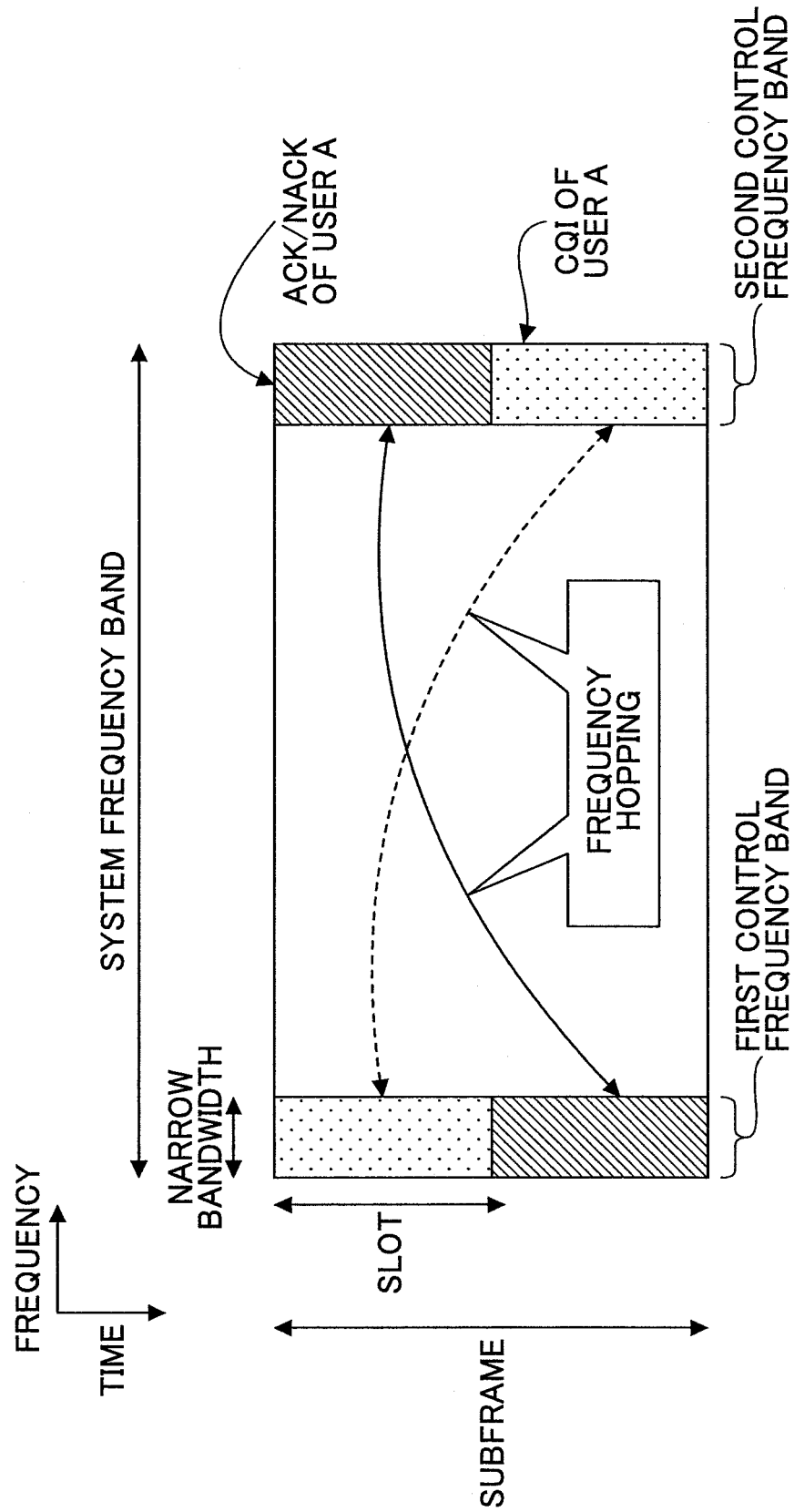
FIG. 8 is a drawing illustrating a control information transmission method (7)

FIG. 8 is a drawing illustrating a control information transmission method (7). FIG. 8 is similar to FIG. 7 in that the same user uses the first and second control frequency bands both in the first and second slots. In this method, however, the first control frequency band in the first slot is used to transmit a channel quality indicator (CQI) and the second control frequency band in the first slot is used to transmit acknowledgement/negative-acknowledgement information (ACK/NACK), or vice versa. Meanwhile, in the second slot, the second control frequency band is used to transmit the CQI and the first control frequency band is used to transmit the ACK/NACK, or vice versa. With this method, since the ACK/NACK and the CQI are transmitted separately, it is not necessary to provide a transport format for multiplexing the ACK/NACK and the CQI. For example, this method is preferable to improve the detection accuracy of the ACK/NACK and thereby to reduce the processing load in blind detection.

(Method 8)

Figure 9:
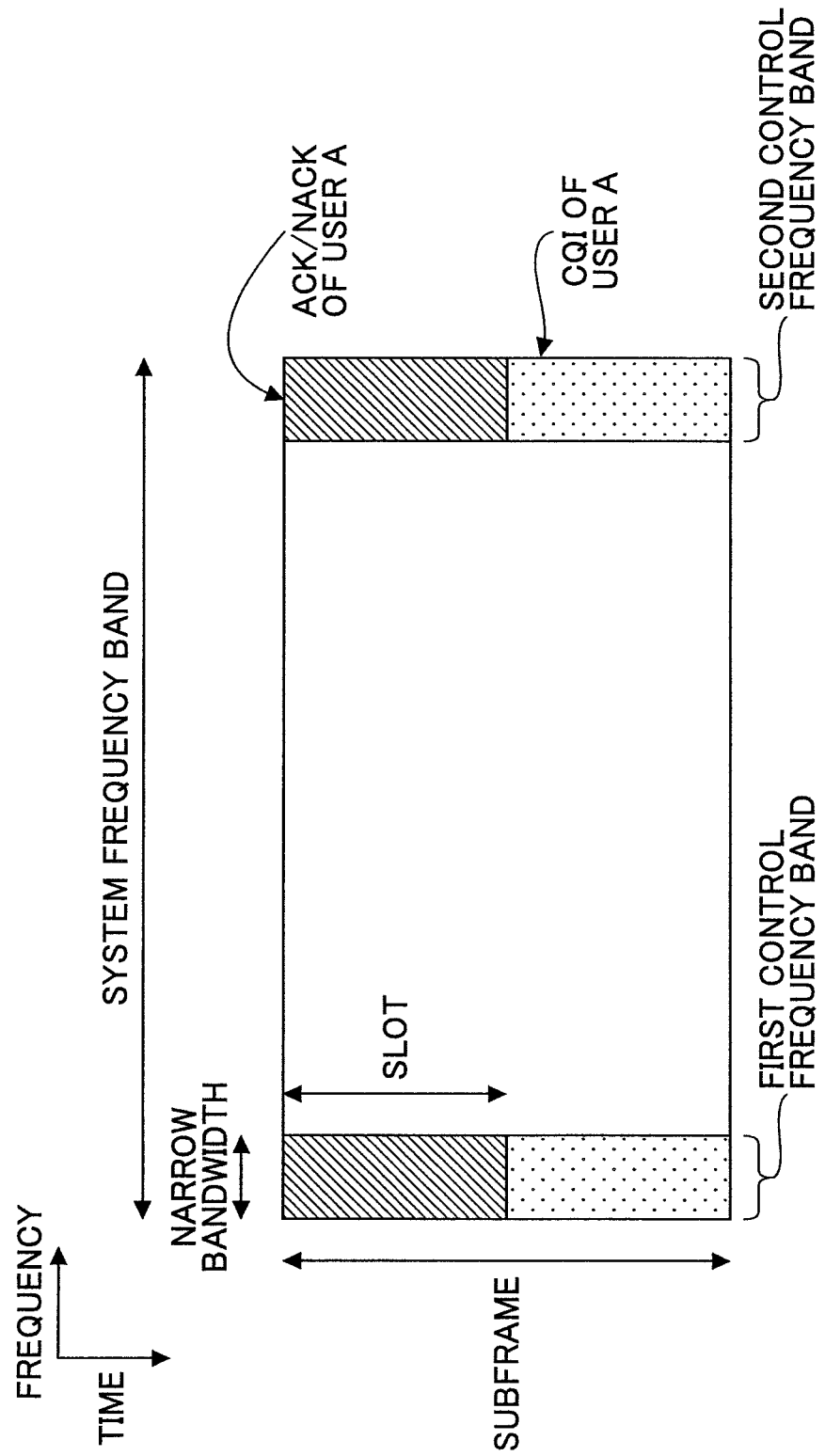
FIG. 9 is a drawing illustrating a control information transmission method (8)

FIG. 9 is a drawing illustrating a control information transmission method (8). In FIG. 9, similarly to FIG. 8, the ACK/NACK and the CQI are transmitted separately. In this method, however, both of the first and second control frequency bands in the first slot are used to transmit the acknowledgement/negative acknowledgement information (ACK/NACK). Meanwhile, in the second slot, both of the first and second control frequency bands are used to transmit the channel quality indicator (CQI). The ACK/NACK and the CQI may be transmitted in the reverse order. Also with this method, it is not necessary to provide a transport format for multiplexing the ACK/NACK and the CQI.

(Method 9)

Figure 10:
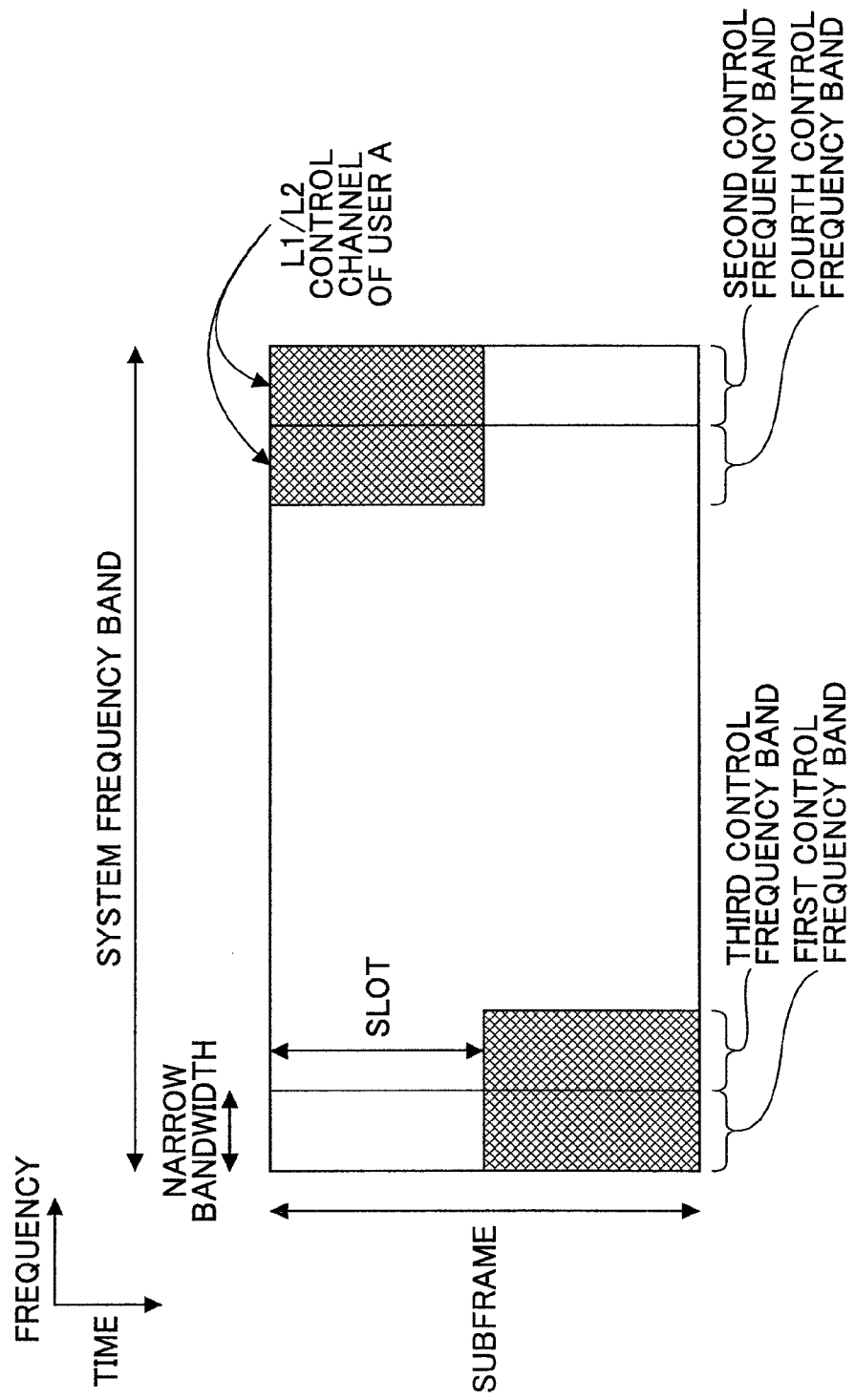
FIG. 10 is a drawing illustrating a control information transmission method (9)

FIG. 10 is a drawing illustrating a control information transmission method (9). In FIG. 10, similarly to FIG. 2, an L1/L2 control channel is transmitted from user A to the base station according to a frequency hopping pattern using different frequency bands. In this method, however, third and fourth control frequency bands are used in addition to the first and second control frequency bands. Similarly to the method of FIG. 7, this method is preferable when the number of multiplexed users is large, when the number of bits of control information of each user is large, or when the radio propagation conditions are poor. In the example shown in FIG. 10, the third and fourth control frequency bands have the same bandwidth as that of the first and second control frequency bands. Alternatively, the third and fourth control frequency bands may be obtained by dividing each of the first and second control frequency bands, for example, into two.

(Method 10)

Figure 11:
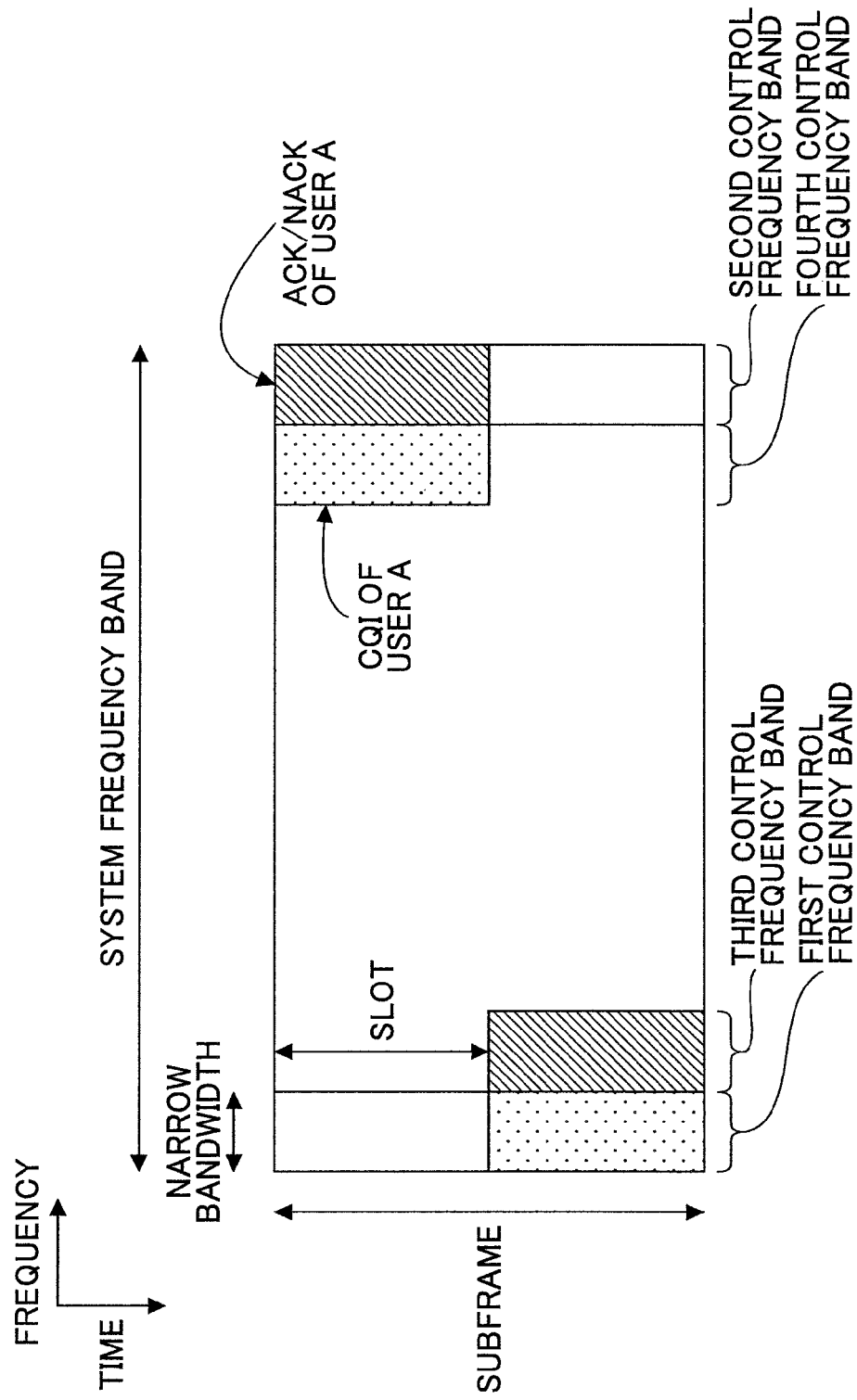
FIG. 11 is a drawing illustrating a control information transmission method (10)

FIG. 11 is a drawing illustrating a control information transmission method (10). In FIG. 11, similarly to FIG. 10, third and fourth control frequency bands are used in addition to the first and second control frequency bands. In this method, however, the ACK/NACK is transmitted in the first slot using the second control frequency band and is transmitted in the second slot using the third control frequency band. Similarly, the CQI is transmitted in the first slot using the fourth control frequency band and is transmitted in the second slot using the first control frequency band. The third and fourth control frequency bands may be obtained by dividing each of the first and second control frequency bands, for example, into two.

(Method 11)

Figure 12:
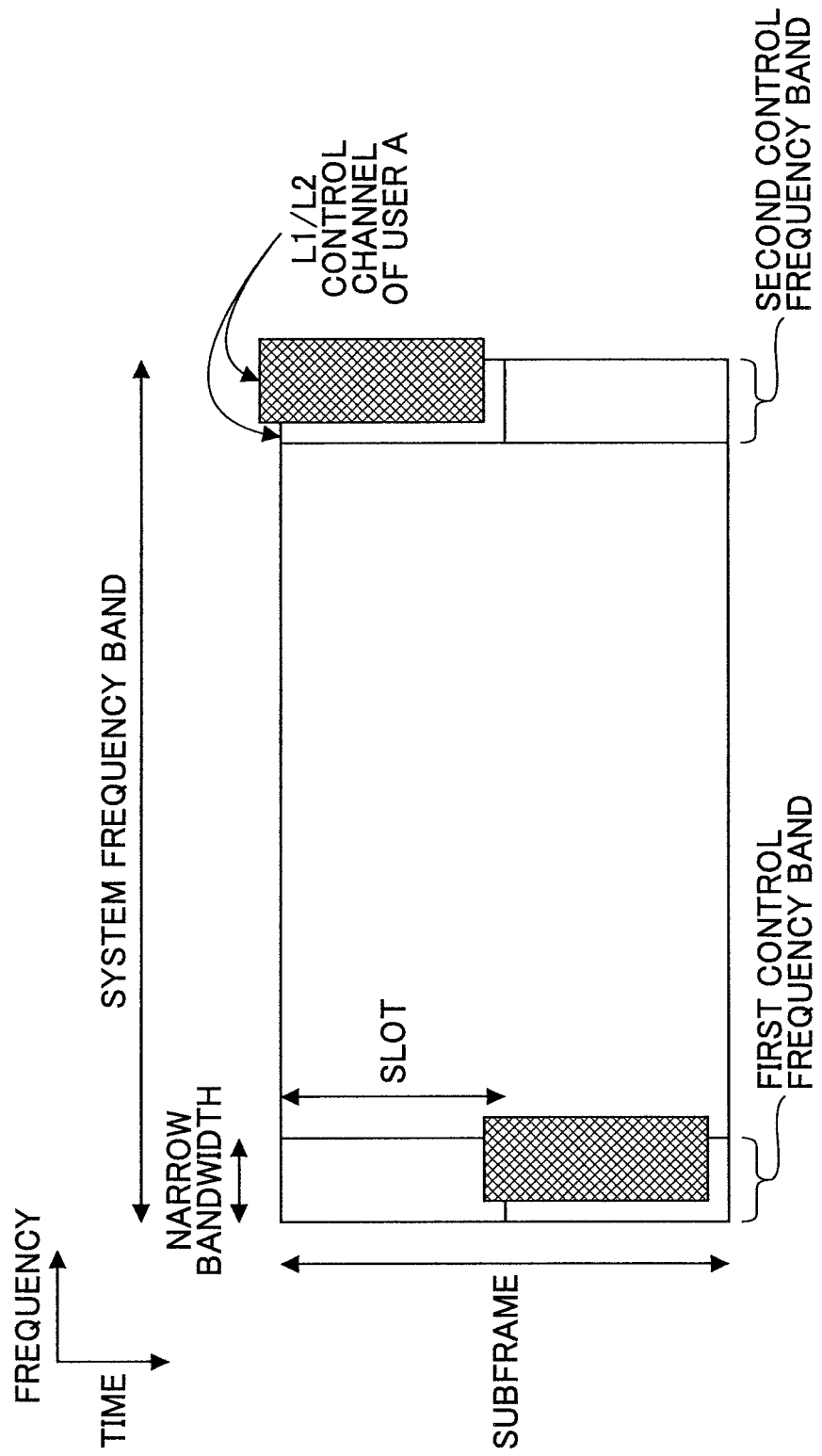
FIG. 12 is a drawing illustrating a control information transmission method (11)

FIG. 12 is a drawing illustrating a control information transmission method (11). In FIG. 12, similarly to FIG. 2, an L1/L2 control channel is transmitted from user A to the base station according to a frequency hopping pattern using different frequency bands. In this method, however, multiple sets of control information of the same user are code-division-multiplexed in the first and second control frequency bands. Similarly to the method of FIG. 7, this method is preferable when the number of multiplexed users is large, when the number of bits of control information of each user is large, or when the radio propagation conditions are poor.

(Method 12)

Figure 13:
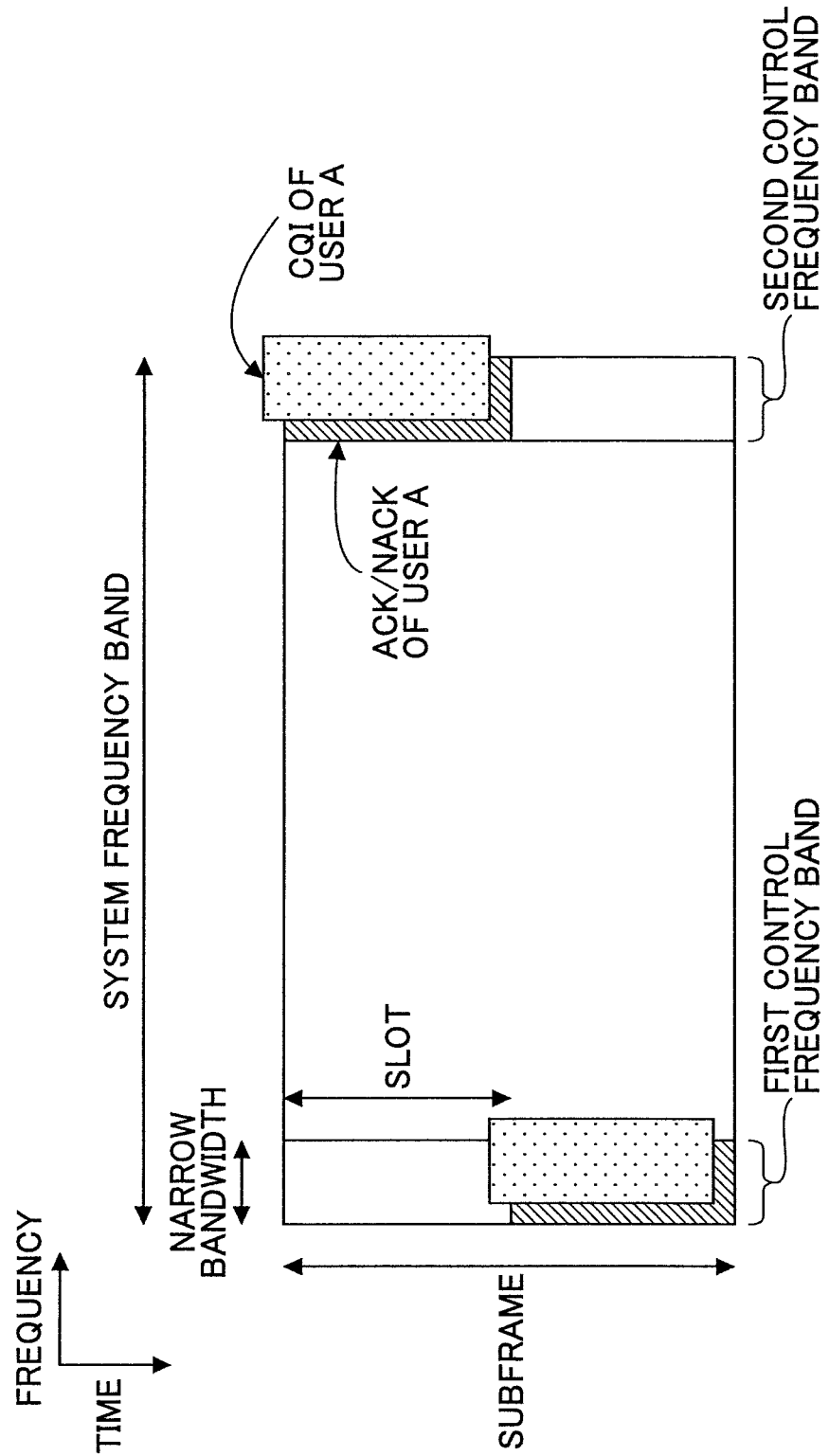
FIG. 13 is a drawing illustrating a control information transmission method (12)

FIG. 13 is a drawing illustrating a control information transmission method (12). In FIG. 13, similarly to FIG. 12, multiple sets of control information of the same user are code-division-multiplexed in the first and second control frequency bands. In this method, however, the ACK/NACK and the CQI are code-division-multiplexed in the second control frequency band in the first slot and are code-division-multiplexed in the first control frequency band in the second slot.

In FIG. 10 (Method 9) through FIG. 13 (Method 12), frequency hopping is performed by changing the frequency band every slot. However, the methods 9 through 12 may also be applied to a case where the control information is transmitted using the first and second control frequency bands at the same time as shown in FIG. 7 (Method 6).

<B. User Device>

Figure 14:
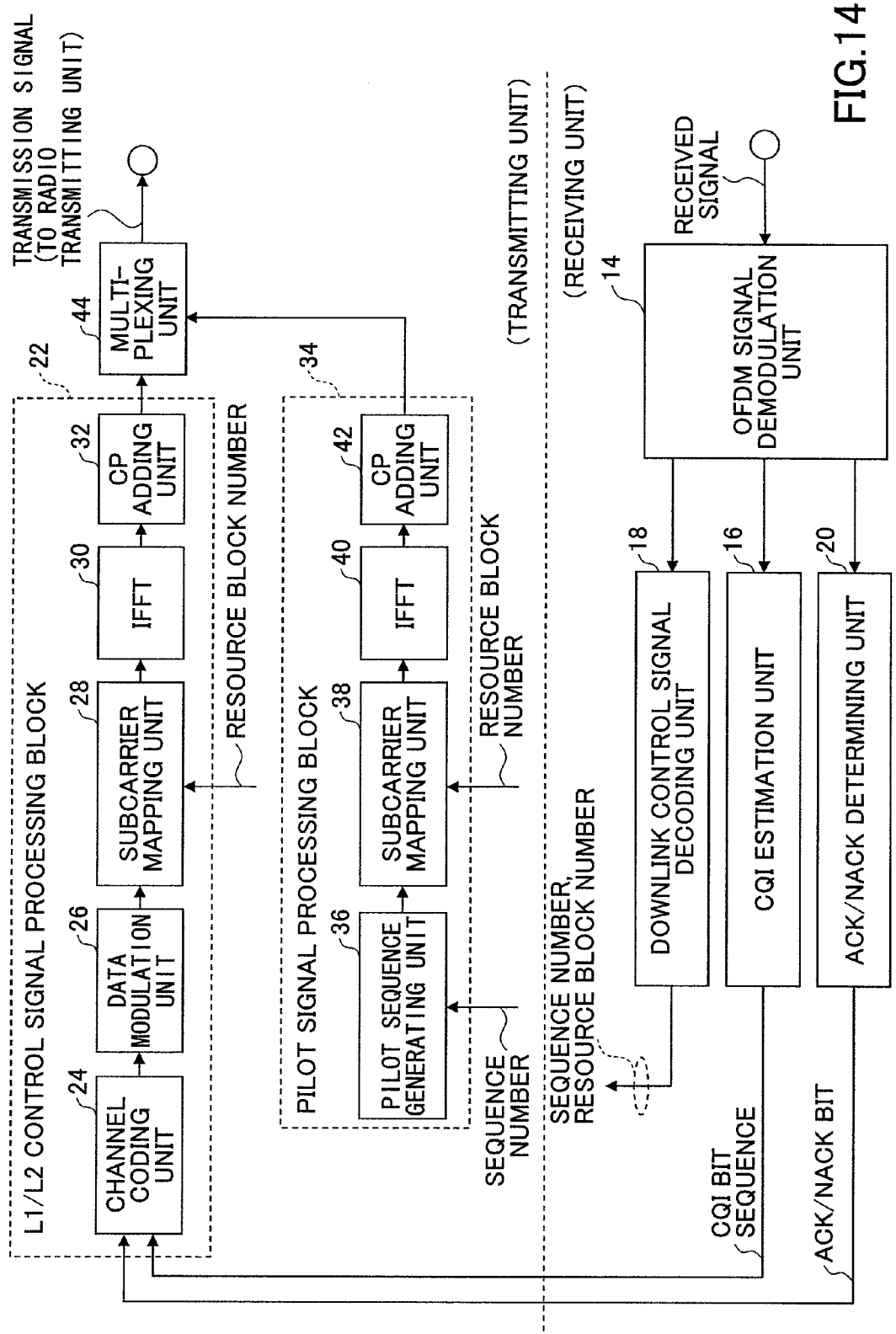
FIG. 14 is a functional block diagram of a user device.

FIG. 14 is a functional block diagram of the user device 100. As shown in FIG. 14, the user device 100 includes an OFDM signal demodulation unit 14; a CQI estimation unit 16; a downlink control signal decoding unit 18; an ACK/NACK determining unit 20; an L1/L2 control signal processing block 22 including a channel coding unit 24, a data modulation unit 26, a subcarrier mapping unit 28, an inverse fast Fourier transform unit (IFFT) 30, and a guard interval adding unit (CP) 32; a pilot signal processing block 34 including a pilot sequence generating unit 36, a subcarrier mapping unit 38, an inverse fast Fourier transform unit (IFFT) 40, and a guard interval adding unit 42; and a multiplexing unit 44.

The OFDM signal demodulation unit 14 demodulates a received signal modulated according to OFDM and thereby extracts a baseband signal. In general, the OFDM signal demodulation unit 14 performs processing such as removal of guard intervals, Fourier transformation, subcarrier demapping, and data demodulation on the received signal, and extracts a downlink pilot channel, a downlink control channel (and/or a broadcast channel), and a downlink data channel.

The CQI estimation unit 16 generates a channel quality indicator (CQI) indicating downlink channel conditions based on the reception quality of the downlink pilot channel. The reception quality of the downlink pilot channel may be represented by any appropriate indicator such as a signal-to-interference power ratio (SIR), a signal-to-interference plus noise power ratio (SINR), or an energy per bit to noise power spectral density ratio ($Eb/N_0$). The CQI can be obtained by appropriately quantizing the reception quality that is classified into multiple levels. For example, the reception quality may be represented by 32 bits and the CQI may be represented by 5 bits. The pilot channel is a signal known to both sending and receiving ends, and may also be called a reference signal or a training signal.

The downlink control signal decoding unit 18 decodes the downlink control channel and thereby extracts a downlink control signal. The downlink control channel may be a downlink L1/L2 control channel or a broadcast channel (BCH). In this embodiment, the downlink control signal may include a code sequence number of a pilot channel used for communications and scheduling information (resource block numbers, transport formats, user identification information, etc.) for downlink and/or uplink.

The ACK/NACK determining unit 20 determines whether the downlink data channel has been properly received by, for example, performing error detection. For example, the error detection may be performed by cyclic redundancy check (CRC).

The L1/L2 control signal processing block 22 generates an L1/L2 control channel to be transmitted via uplink.

The channel coding unit 24 performs channel coding of control information to be transmitted via uplink at a given coding rate. In this example, the control information is transmitted via the L1/L2 control channel. In this embodiment, the control information includes at least one of acknowledgement/negative-acknowledgement information (ACK/NACK) for a downlink data channel and a CQI indicating downlink channel conditions.

The data modulation unit 26 performs data modulation of the control information using a modulation scheme such as phase shift keying (e.g., BPSK, QPSK, or 8PSK) or quadrature amplitude modulation (QAM).

The sub-carrier mapping unit 28 maps the control information to subcarriers that are within the system frequency band and available to the user device 100. More specifically, the control information may be mapped to the first and second control frequency bands as shown in FIG. 2 or to resource blocks allocated to an uplink data channel as shown in FIG. 6.

The inverse fast Fourier transform unit (IFFT) inverse-fast-Fourier-transforms a signal including the control information mapped to the subcarriers to transform the signal in the frequency domain into a signal in the time domain.

The guard interval adding unit (CP) 32 adds guard intervals to the transformed signal. The guard intervals may be generated by a cyclic prefix (CP) scheme.

The pilot signal processing block 34 generates a pilot channel to be transmitted via uplink.

The pilot sequence generating unit 36 generates a code sequence representing the pilot channel based on the code sequence number of the pilot channel used for communications. Any appropriate code sequence may be used for the pilot channel. For example, a CAZAC sequence may be used for the pilot channel.

The subcarrier mapping unit 38 maps the pilot channel to appropriate subcarriers.

The inverse fast Fourier transform unit (IFFT) 40 inverse-fast-Fourier-transforms a signal including the pilot channel mapped to the subcarriers to transform the signal in the frequency domain into a signal in the time domain.

The guard interval adding unit 42 adds guard intervals to the transformed signal.

The multiplexing unit 44 multiplexes the L1/L2 control channel and the pilot channel. The multiplexing unit 44 may multiplex the channels by simple addition or by using a multiplexing scheme such as time division multiplexing. A transmission signal including the multiplexed signal is input to a radio transmitting unit (not shown) and is wirelessly transmitted via uplink.

<C. Base Station>

Figure 15:
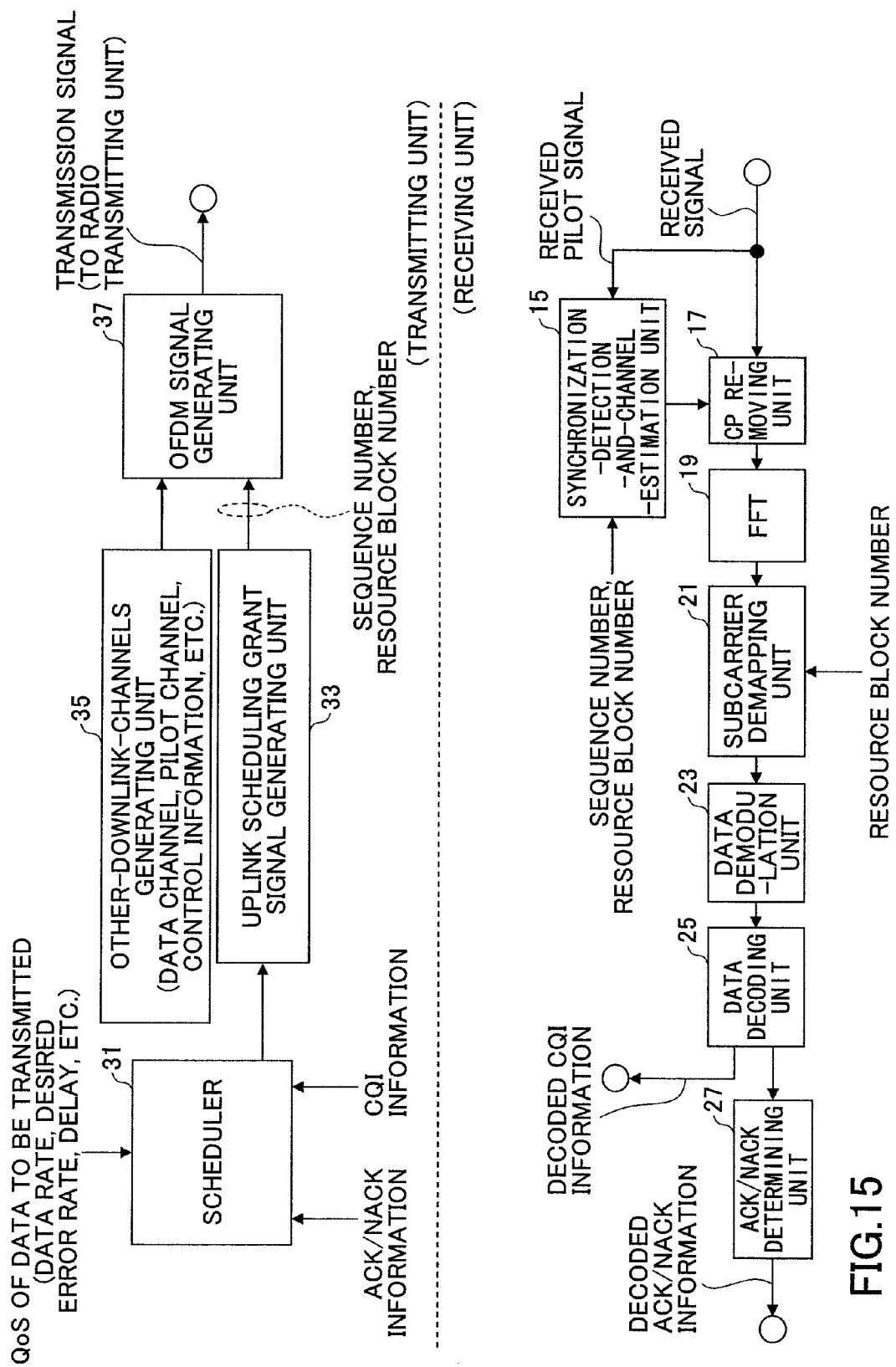
FIG. 15 is a functional block diagram of a base station.

FIG. 15 is a functional block diagram of the base station 200. As shown in FIG. 15, the base station 200 includes a synchronization-detection-and-channel-estimation unit 15, a guard interval removing unit 17, a fast Fourier transform unit (FFT) 19, a subcarrier demapping unit 21, a data demodulation unit 23, a data decoding unit 25, an ACK/NACK determining unit 27, a scheduler 31, an uplink scheduling grant signal generating unit 33, an other-downlink-channels generating unit 35, and an OFDM signal generating unit 37.

The synchronization-detection-and-channel-estimation unit 15 performs synchronization detection and channel estimation based of a pilot channel received via uplink.

The guard interval removing unit 17 removes guard intervals from a received signal according to the synchronization timing of the received signal.

The fast Fourier transform unit (FFT) 19 fast-Fourier-transforms the received signal and thereby transforms the received signal in the time domain into a signal in the frequency domain.

The subcarrier demapping unit 21 extracts a signal mapped to subcarriers. The signal may include only a control channel or both a control channel and a data channel.

The data demodulation unit 23 performs data demodulation of the received signal.

The data decoding unit 25 performs data decoding of the data-demodulated signal.

The data demodulation and the data decoding are performed for a control channel and a data channel separately. However, for brevity, those processes are represented collectively in FIG. 15.

The ACK/NACK determining unit 27 determines whether the uplink data channel has been properly received by, for example, performing error detection. For example, the error detection may be performed by cyclic redundancy check (CRC).

The scheduler 31 performs scheduling to determine allocation of radio resources. The scheduling may be performed based, for example, on the radio propagation conditions, desired quality (QoS), and whether retransmission is necessary. Any appropriate algorithm such as a MAX-C/I method or a proportional fairness method may be used for the scheduling. Downlink radio propagation conditions may be estimated based on CQIs reported from user devices and uplink radio propagation conditions may be estimated based on received SINRs. The desired quality (QoS) may be represented, for example, by a data rate, an error rate, and/or an allowed delay. Whether retransmission is necessary may be determined based on the acknowledgement/negative-acknowledgement information (ACK/NACK).

The uplink scheduling grant signal generating unit 33 generates control information including scheduling information (uplink grant) allowing transmission of a data channel via uplink. The scheduling information includes allocated resource blocks and transport formats.

The other-downlink-channels generating unit 35 generates downlink signals (e.g., a data channel, a broadcast channel, a synchronization channel, a pilot channel, and other control channels) other than the scheduling information.

The OFDM signal generating unit 37 modulates signals including various downlink information items according to OFDM to generate a downlink transmission signal. In general, the OFDM signal generating unit 37 performs processing such as channel coding, data modulation, subcarrier mapping, IFFT, and addition of guard intervals. The downlink transmission signal is input to a radio transmitting unit (not shown) and is wirelessly transmitted via downlink.

<D. Variations>
(Uplink/Downlink)

In the above embodiments, cases where OFDM is employed for uplink are mainly described. However, the present invention may also be applied to downlink. In other words, the present invention may be widely applied to systems where retransmission control information and channel quality indicators are transmitted using a multicarrier scheme.

(Number of Slots, Bandwidth, Number of Frequency Bands)

In the above embodiments, it is assumed that each of the subframes constituting a radio frame includes two slots. However, the number of slots may be one or greater than two. Also in the above embodiments, one frequency band (first or second control frequency band) dedicated for transmission of control information is provided at each end of the system frequency band. However, any number of control frequency bands may be provided at any positions in the system frequency band. Still, the control frequency bands are preferably arranged such that they are as far apart as possible from each other along the frequency axis in order to increase the diversity gain by frequency hopping. In the above embodiments, frequency hopping is performed by changing the frequency band every slot. Alternatively, frequency hopping may be performed by changing the frequency band every subframe or every one or more symbols (e.g., one or more OFDM symbols) in a slot. To reduce the overhead in radio transmission, it is preferable to set the bandwidth of a control frequency band as narrow as possible. Also, the bandwidth of a control frequency band may be determined according to the system bandwidth.

(Control Information Other than ACK/NACK and CQI)

In the above embodiments, the acknowledgement/negative-acknowledgement information (ACK/NACK) and the channel quality indicator. (CQI) are used as examples of control information to be transmitted using control frequency bands provided at the ends of the system frequency band. However, other control information may also be transmitted using the control frequency bands. For example, retransmission control information including a packet number, a puncturing pattern, and user identification information for a packet for which the ACK/NACK is returned may be transmitted using the control frequency bands. Nonetheless, to frequently report control information to the receiving end while reducing the overhead, it is preferable to keep the number of information bits to be transmitted via dedicated control frequency bands at a small value by limiting the types of control information to the ACK/NACK and/or the CQI.

(Hybrid of Single-Carrier Scheme and Multicarrier Scheme)

In the above embodiment, for descriptive purposes, it is assumed that the mobile communication system employs OFDM for both uplink and downlink. However, this does not mean that the mobile communication system must employ only OFDM. For example, a mobile communication system may employ both a single-carrier scheme and a multicarrier scheme and one of the methods described in the above embodiments may be used for the multicarrier scheme. For example, OFDM may be used together with one of the methods described in the above embodiments in an area where radio propagation conditions are good (e.g., an area near a base station), and a single-carrier scheme may be used in an area where radio propagation conditions are poor (e.g., an area near the cell edge). When both a single-carrier scheme and a multicarrier scheme are used in a system, it is preferable to use a radio transmission method common to both schemes. For example, it is preferable to use one of the transmission methods shown in FIGS. 2, 6, and 10-13. These methods do not concurrently use frequency bands that are discontinuous on the frequency axis (i.e., only use a frequency band that is continuous on the frequency axis), and therefore can be used also for a single-carrier scheme. Also, even when both a single-carrier scheme and a multicarrier scheme are used in a system, the transmission methods shown in FIGS. 2 through 13 may be used to multiplex control resources (i.e., a user device employing a single-carrier scheme uses one of the transmission methods shown in FIGS. 2, 6, and 10-13; and a user device employing a multicarrier scheme uses one of the transmission methods shown in FIGS. 2-13).

(Signaling Resources Used for ACK/NACK)

When receiving a control channel or a data channel, the receiving end needs to know the radio resources used to transmit the channel and how the radio resources are used. Accordingly, when transmitting the ACK/NACK or the CQI, it is necessary to report to the receiving end how radio resources are being used. However, using radio resources only for this reporting may increase the overhead. Therefore, to efficiently use resources, it is necessary to devise an efficient reporting method.

-Reporting Method (1)

An exemplary reporting method (1) is based on how scheduling information is included in a downlink control channel (i.e., mapping positions of the scheduling information). A downlink L1/L2 control channel includes multiple sets of scheduling information for users to be multiplexed. In this method, it is assumed that control information resources (resources used for control information) corresponding to the maximum number of multiplexed users $N_{CCH\_MAX}$ are reserved. The user device receives the downlink L1/L2 control channel and extracts scheduling information for itself from the downlink L1/L2 control channel. In this case, the user device can determine whether scheduling information for itself is included in the downlink L1/L2 control channel by repeating the decoding process for up to the maximum number of multiplexed users $N_{CCH\_MAX}$.

Let us assume that a user device UE has found downlink scheduling information for itself at the xth decoding process (i.e., at the xth position). The user device UE receives a downlink data channel via resource blocks specified in the downlink scheduling information and generates an ACK/NACK for the downlink data channel. Then, the user device UE reports the ACK/NACK to the base station by using a control information resource corresponding one-to-one to the xth position.

Meanwhile, if the user device UE finds uplink scheduling information for itself at the xth decoding process (i.e., at the xth position), the user device UE transmits an uplink data channel using resource blocks specified in the uplink scheduling information. When receiving the uplink data channel, the base station generates an ACK/NACK. Then, the base station writes the ACK/NACK at the xth position in a downlink L1/L2 control channel. The user device UE reads the ACK/NACK at the xth position in the downlink L1/L2 control channel and determines whether retransmission is necessary. Here, it is assumed that the transmission timings of the data channel and the ACK/NACK are known to the base station and the user device.

With the positional relationship between scheduling information and control information determined in advance as described above, the user device and the base station can determine whether retransmission is necessary without reporting user identification information and resource information each time.

-Reporting Method (2)

In the reporting method (1) described above, mapping positions of the control channel are used. In an exemplary reporting method (2), positions of resource blocks are used instead. In this method, control information resources corresponding to the total number of resource blocks $N_{RB\_MAX}$ are reserved.

Let us assume that a resource block RB_x at the xth position is allocated to a user device UE for downlink transmission. The user device UE decodes a data channel in the resource block RB_x and generates an ACK/NACK for the data channel. Then, the user device UE reports the ACK/NACK to the base station by using a control information resource corresponding one-to-one to the xth position.

Meanwhile, when a resource block RB_x at the xth position is allocated to the user device UE for uplink transmission, the user device UE transmits an uplink data channel via the resource block RB_x. When receiving the uplink data channel, the base station generates an ACK/NACK. Then, the base station writes the ACK/NACK at the xth position in a downlink L1/L2 control channel. The user device UE reads the ACK/NACK at the xth position in the downlink L1/L2 control channel and determines whether retransmission is necessary. Also in this method, it is assumed that the transmission timings of the data channel and the ACK/NACK are known to the base station and the user device.

Thus, determining the positional relationship between allocated resource blocks and control information in advance enables the user device and the base station to efficiently determine whether retransmission is necessary.

Since the CQI is generally reported at predetermined intervals, information (e.g., a transmission resource number, a transmission interval, and a transmission period) necessary for transmission of the CQI may be signaled (transmitted) only once when the CQI is reported the first time or may be signaled (transmitted) only once via a broadcast channel in advance. This method makes it possible to report the CQI for the second and subsequent times based on the already signaled information and thereby makes it possible to reduce the amount of signaling.

INDUSTRIAL APPLICABILITY

The present invention can be applied to any appropriate mobile communication system where control information is transmitted by using a multicarrier scheme.

The present invention is not limited to the specifically disclosed embodiments, and variations and modifications may be made without departing from the scope of the present invention. Although specific values are used in the above descriptions to facilitate the understanding of the present invention, the values are just examples and different values may also be used unless otherwise mentioned. The distinctions between the embodiments are not essential for the present invention, and the embodiments may be used individually or in combination. Also, subject matter described in one embodiment may be applied to subject matter in another embodiment unless they are contradictory. Although functional block diagrams are used to describe apparatuses in the above embodiments, the apparatuses may be implemented by hardware, software, or a combination of them.

The present international application claims priority from Japanese Patent Application No. 2008-055580 filed on Mar. 5, 2008, the entire contents of which are hereby incorporated herein by reference.

The invention claimed is:

1. A user device for a mobile communication system employing a multicarrier scheme, the user device comprising:
    a mapper that maps control information to subcarriers in a subframe;
    an inverse Fourier transformer that inverse-Fourier-transforms a signal of the mapped control information; and
    a transmitter that wirelessly transmits a transmission signal including the inverse-Fourier-transformed signal to a base station, wherein
    the control information is mapped to control frequency bands that are discontinuous in a frequency domain and are provided across the subframe separately from frequency bands for a shared data channel; and
    the mapping is performed such that the control information for the base station mapped to one of the control frequency bands and the same control information or different control information for the base station mapped to another one of the control frequency bands are transmitted at the same time from the same user device,
    wherein the subframe includes first and second time units;
    the control frequency bands include first and third control frequency bands and second and fourth control frequency bands that are apart from the first and third control frequency bands in the frequency domain; and
    the mapping is performed such that
        first control information for the base station is transmitted using the first control frequency band in the first time unit and transmitted using the fourth control frequency band in the second time unit from the same user device, and
        second control information for the base station is transmitted using the third control frequency band in the first time unit and transmitted using the second control frequency band in the second time unit from the same user device,
    wherein each of the first control frequency band, the second control frequency band, the third control frequency band, and the fourth control frequency band occupy a different frequency band in the subframe.

2. The user device as claimed in claim 1, wherein each of the time units is a slot that is one half of the subframe.

3. The user device as claimed in claim 1, wherein the first control information is acknowledgement/negative-acknowledgement information for a previously received shared data channel and the second control information indicates quality of a received radio signal.

4. A method performed by a user device for a mobile communication system employing a multicarrier scheme, the method comprising the steps of:
    mapping control information to subcarriers in a subframe;
    inverse-Fourier-transforming a signal of the mapped control information; and
    wirelessly transmitting a transmission signal including the inverse-Fourier-transformed signal to a base station, wherein
    the control information is mapped to control frequency bands that are discontinuous in a frequency domain and are provided across the subframe separately from frequency bands for a shared data channel; and
    the mapping is performed such that the control information for the base station mapped to one of the control frequency bands and the same control information or different control information for the base station mapped to another one of the control frequency bands are transmitted at the same time from the same user device, wherein the subframe includes first and second time units;
the control frequency bands include first and third control frequency bands and second and fourth control frequency bands that are apart from the first and third control frequency bands in the frequency domain; and
the mapping is performed such that
first control information for the base station is transmitted using the first control frequency band in the first time unit and transmitted using the fourth control frequency band in the second time unit from the same user device, and
second control information for the base station is transmitted using the third control frequency band in the first time unit and transmitted using the second control frequency band in the second time unit from the same user device,
wherein each of the first control frequency band, the second control frequency band, the third control frequency band, and the fourth control frequency band occupy a different frequency band in the subframe.

5. A base station for a mobile communication system employing a multicarrier scheme, the base station comprising:
a Fourier transformer that Fourier-transforms a received signal;
a demapper that extracts a signal mapped to subcarriers from the Fourier-transformed signal; and
a decoder that decodes control information extracted by the demapper, wherein
the control information is extracted from control frequency bands that are discontinuous in a frequency domain and are provided across a subframe separately from frequency bands for a shared data channel; and
the control information for the base station mapped to one of the control frequency bands and the same control information or different control information for the base station mapped to another one of the control frequency bands are transmitted in a same time period in the subframe from a same user device,
wherein the subframe includes first and second time units;
the control frequency bands include first and third control frequency bands and second and fourth control frequency bands that are apart from the first and third control frequency bands in the frequency domain; and
the mapping is performed such that
first control information for the base station is transmitted using the first control frequency band in the first time unit and transmitted using the fourth control frequency band in the second time unit from the same user device, and
second control information for the base station is transmitted using the third control frequency band in the first time unit and transmitted using the second control frequency band in the second time unit from the same user device,
wherein each of the first control frequency band, the second control frequency band, the third control frequency band, and the fourth control frequency band occupy a different frequency band in the subframe.

6. A method performed by a base station for a mobile communication system employing a multicarrier scheme, the method comprising the steps of:
Fourier-transforming a received signal;
extracting a signal mapped to subcarriers from the Fourier-transformed signal; and
decoding control information extracted in the extracting step, wherein the control information is extracted from control frequency bands that are discontinuous in a frequency domain and are provided across a subframe separately from frequency bands for a shared data channel; and
the control information for the base station mapped to one of the control frequency bands and the same control information or different control information for the base station mapped to another one of the control frequency bands are transmitted in a same time period in the subframe from a same user device,
wherein the subframe includes first and second time units;
the control frequency bands include first and third control frequency bands and second and fourth control frequency bands that are apart from the first and third control frequency bands in the frequency domain; and
the mapping is performed such that
first control information for the base station is transmitted using the first control frequency band in the first time unit and transmitted using the fourth control frequency band in the second time unit from the same user device, and
second control information for the base station is transmitted using the third control frequency band in the first time unit and transmitted using the second control frequency band in the second time unit from the same user device,
wherein each of the first control frequency band, the second control frequency band, the third control frequency band, and the fourth control frequency band occupy a different frequency band in the subframe.

7. A mobile communication system employing a multicarrier scheme, comprising:
a user device; and
a base station, wherein
the user device includes
a mapper that maps control information to subcarriers in a subframe,
an inverse Fourier transformer that inverse-Fourier-transforms a signal of the mapped control information, and
a transmitter that wirelessly transmits a transmission signal including the inverse-Fourier-transformed signal to the base station;
the base station includes
a Fourier transformer that Fourier-transforms a received signal,
a demapper that extracts a signal mapped to subcarriers from the Fourier-transformed signal, and
a decoder that decodes control information extracted by the demapper;
the control information is mapped to control frequency bands that are discontinuous in a frequency domain and are provided across the subframe separately from frequency bands for a shared data channel; and
the mapping is performed such that the control information for the base station mapped to one of the control frequency bands and the same control information or different control information for the base station mapped to another one of the control frequency bands are transmitted at the same time from the same user device,
wherein the subframe includes first and second time units;
the control frequency bands include first and third control frequency bands and second and fourth control frequency bands that are apart from the first and third control frequency bands in the frequency domain; and
the mapping is performed such that
first control information for the base station is transmitted using the first control frequency band in the first time unit and transmitted using the fourth control frequency band in the second time unit from the same user device, and second control information for the base station is transmitted using the third control frequency band in the first time unit and transmitted using the second control frequency band in the second time unit from the same user device, wherein each of the first control frequency band, the second control frequency band, the third control frequency band, and the fourth control frequency band occupy a different frequency band in the subframe.

\* \* \* \* \*